(12) United States Patent
Maida et al.

(10) Patent No.: US 7,138,703 B2
(45) Date of Patent: Nov. 21, 2006

(54) PREVENTIVE FILM FOR POLARIZER AND POLARIZING PLATE USING THE SAME

(75) Inventors: Norimasa Maida, Yamaguchi-ken (JP); Koji Fujii, Yamaguchi-ken (JP); Go Fukui, Yamaguchi-ken (JP)

(73) Assignee: Toyo Kohan Co., Ltd., Tokyo (JP)

( * ) Notice: Subject to any disclaimer, the term of this patent is extended or adjusted under 35 U.S.C. 154(b) by 4 days.

(21) Appl. No.: 10/498,252

(22) PCT Filed: Dec. 13, 2002

(86) PCT No.: PCT/JP02/13080

§ 371 (c)(1),
(2), (4) Date: Feb. 16, 2005

(87) PCT Pub. No.: WO03/052469

PCT Pub. Date: Jun. 26, 2003

(65) Prior Publication Data

US 2005/0128613 A1 Jun. 16, 2005

(30) Foreign Application Priority Data

Dec. 14, 2001 (JP) ............................. 2001-382321

(51) Int. Cl.
*H01L 23/58* (2006.01)
(52) U.S. Cl. ...................... 257/635; 257/401; 257/499; 428/411.1; 428/412; 428/480; 428/543
(58) Field of Classification Search ................ 257/401, 257/499; 428/480, 623, 212, 412; 350/397
See application file for complete search history.

(56) References Cited

U.S. PATENT DOCUMENTS 4,009,312 A * 2/1977 Hayashi et al. ............. 428/213

(Continued)

FOREIGN PATENT DOCUMENTS

JP    8-62419 A    3/1996

(Continued)

OTHER PUBLICATIONS

Pending Application No. 10498790☐☐.*

*Primary Examiner*—Andy Huynh
*Assistant Examiner*—Tram H. Nguyen
(74) *Attorney, Agent, or Firm*—Browdy and Neimark, PLLC

(57) ABSTRACT

A preventive film for a polarizer which comprises a non-oriented two-layer film comprising a polycarbonate film having a glass transition temperature of 100° C. or higher and, laminated on one surface thereof, a polyester him: a preventive film for a polarizer which comprises a non-oriented three-layer comprising a polycarbonate film having a glass transition temperature of 100° C. or higher and a polyester film laminated on one surface thereof and a polybutylene terephthalate film laminated on the other surface thereof and a polarizing pate which uses a polarizing film comprising a polarizer and two sheets of the above film adhered by heating with no use of an adhesive agent to both sides thereof. The preventive film exhibits an extremely small double refraction and is capable of being adhered directly to a polarizer through heating and the polarizing plate can be produced at a low cost.

8 Claims, 2 Drawing Sheets

U.S. PATENT DOCUMENTS

| | | | | |
|---|---|---|---|---|
| 4,592,623 | A * | 6/1986 | Yamamoto et al. | 359/491 |
| 4,957,820 | A * | 9/1990 | Heyes et al. | 428/623 |
| 5,643,680 | A * | 7/1997 | Osaki et al. | 428/480 |
| 5,804,626 | A * | 9/1998 | Rogers et al. | 524/195 |
| 6,055,096 | A * | 4/2000 | Michihata et al. | 359/352 |
| 6,569,515 | B1 * | 5/2003 | Hebrink et al. | 428/212 |

FOREIGN PATENT DOCUMENTS

| | | |
|---|---|---|
| JP | 9-127332 A | 5/1997 |
| JP | 10-119162 A | 5/1998 |
| JP | 2000-85068 A | 3/2000 |

\* cited by examiner

PREVENTIVE FILM FOR POLARIZER AND POLARIZING PLATE USING THE SAME

This application is a 371 PCT/JP02/13080

TECHNICAL FIELD

The present invention relates to a preventive film for a polarizer suitable for polarizing plates of liquid-crystal display devices or the like, and polarizing plates using the same.

BACKGROUND ART

A polarizing plate 20 used by attaching to a liquid-crystal display device or the like, for example, has a configuration shown in FIG. 1. Thus, a polarizing film 10 is composed by attaching preventive films 3 for a polarizer, which form preventive layers, via an adhesive 7 to both surfaces of the polarizer 4 in a sandwiched manner. A preventive film 1 for a polarizing film is attached adhesively via a pressure sensitive adhesive 6 to one side of the polarizing film 10. A phase difference film 5 is attached to the other side of the polarizing film 10, and a releasable preventive film 2 for a polarizing film in which a releasing agent 8 is applied to one surface of the film of the same configuration as the preventive film 1 for a polarizing film is adhesively attached thereto via a pressure sensitive adhesive 6.

A polarizer obtained by causing adsorption of iodine or a dichroic dye on a film composed of a hydrophilic polymer such as polyvinyl alcohol and orienting the film by stretching is used as the polarizer 4. The following requirements are placed on the preventive film 3 for a polarizer, which maintains endurance and mechanical properties of the polarizer 4: the film has to be optically transparent, that is, should not demonstrate double refraction easily, and also has to have heat resistance, high mechanical strength, a smooth surface, and good adhesion to the adhesive 7 and pressure sensitive adhesive 6, and a non-oriented film such as a triacetyl cellulose can be used. In order to obtain a clear color and fine image, the phase difference film 5 is required to demonstrate uniform double refraction over the entire surface and have stable optical properties even under severe environmental conditions of high temperature and high humidity. Uniaxially stretched films of polycarbonates have been used therefor.

The preventive film 1 for a polarizing film and the releasable preventive film 2 for a polarizing film are used with the object of preventing the surface of the polarizing film 10 or phase difference film 5 from contamination or scratching in the process of distributing the polarizing film 10 or mounting on a liquid-crystal display device. Those preventing films are attached adhesively to the polarizing film 10 or phase difference film 5 with the pressure sensitive adhesive 6, and it is desired that they can be easily separated in the process of mounting on a liquid-crystal display device. It is preferred that in the releasable preventive film 2 for a polarizing film, the releasing agent 8 be applied to the surface of adhesive bonding to the pressure sensitive adhesive 6 to facilitate peeling.

Based on the aforementioned necessary properties, cellulose films such as triacetyl cellulose, polyester films, polyacryl films, polycarbonate films, and polyethersulfone films are used as the preventive film 3 for a polarizer. A polarizing film 10 is composed by attaching such preventive film 3 for a polarizer in a sandwiched manner via an adhesive 7 so as to protect both surfaces of the polarizer 4. The polarizer 4, as described hereinabove, is prepared by causing adsorption of iodine or a dichroic dye on a film composed of a hydrophilic polymer such as polyvinyl alcohol and orienting the film by stretching, but because the iodine is evaporated if the film is thermally fixed after stretch orientation, the film is used without conducting the thermal fixing. For this reason, the film is greatly expanded and shrunk under the effect of temperature changes or moisture changes in the environment. For this reason, the preventive films 3 for a polarizer which are attached to the polarizer 4 by sandwiching and constrict the deformation caused by temperature changes or moisture changes have to be attached by using the adhesive 7 and cured by heating at a temperature of 90° C. or less at which iodine is not evaporated. Directly thermally attaching to the substrate film, without using an adhesive, and attaching the preventive film for a polarizer by using a usual adhesive which is cured by heating at a high temperature are impossible. Adhesives that are cured by heating at a low temperature are special and expensive products and require an adhesive application process. Therefore, they are a significant obstacle for reducing the cost of polarizing plates.

It is an object of the present invention to provide a preventive film for a polarizer that has an extremely small double refraction and can be directly thermally attached to a polarizer, and also to provide an inexpensive polarizing plate using such a film.

DISCLOSURE OF THE INVENTION

One preventive film for a polarizer in accordance with the present invention is composed of a two-layer film in which a polyester film is laminated on one surface of a polycarbonate film, characterized in that the two-layer film is a non-oriented film.

Another preventive film for a polarizer in accordance with the present invention is composed of a three-layer film in which a polyester film is laminated on one surface of a polycarbonate film and a polybutylene terephthalate film is laminated on the other surface, characterized in that the three-layer film is a non-oriented film.

The aforementioned two-layer film or three-layer film is characterized in that the glass transition temperature of the polycarbonate is 100° C. or higher, the melting point of the polyester is 235° C. or lower, and the polyester film is an ethylene terephthalate—ethylene isophthalate copolymer or the copolymer in which part of the alcohol component of ethylene terephthalate is substituted with cyclohexanedimethanol.

Further, the polarizing plate in accordance with the present invention is a polarizing plate using any of the above-described preventive films for a polarizer.

BEST MODE FOR CARRYING OUT THE INVENTION

In accordance with the present invention, direct thermal attachment of a preventive film for a polarizer to the polarizer is made possible by using a non-oriented two-layer film obtained by laminating a polyester film with a melting point of 235° C. or less on one surface of a polycarbonate film with a glass transition temperature of 100° C. or higher, or a non-oriented three-layer film obtained by laminating a polyester film with a melting point of 235° C. or less on one surface of a polycarbonate film with a glass transition temperature of 100° C. or higher and laminating a polybutylene terephthalate film on the other surface. Therefore, it was clarified that using such a preventive film for a polarizer made it possible to obtain a polarizing plate at a low cost, without using a special adhesive curable by heating at a low temperature.

The present invention will be described below in greater detail.

Figure 2:
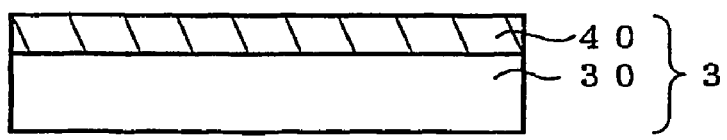
FIG. 2 is a schematic cross-sectional view illustrating an example of the configuration of a two-layer preventive film for a polarizer in accordance with the present invention.
Figure 3:
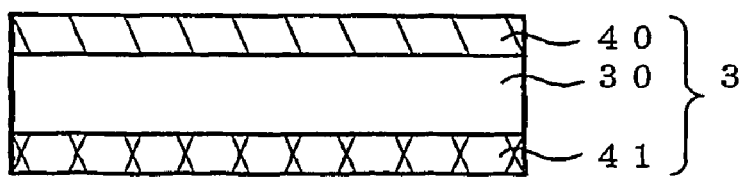
FIG. 3 is a schematic cross-sectional view illustrating an example of the configuration of a three-layer preventive film for a polarizer in accordance with the present invention.

A two-layer non-oriented film in which a thin-layer polyester film 40 is laminated on one surface of a polycarbonate film 30 serving as a substrate, as shown in FIG. 2, or a three-layer non-oriented film in which a thin-layer polyester film 40 is laminated on one surface of a polycarbonate film 30 serving as a substrate and a polybutylene terephthalate film 41 on the other surface, as shown in FIG. 3, is used as the preventive film for a polarizer in accordance with the present invention. The polycarbonate film 30, polyester film 40, and polybutylene terephthalate film 41 are colorless and transparent to the naked eye, and because they are non-oriented, they are practically free from double refraction and optically also colorless and produce no adverse effect on detection of optical defects of the polarizing plate 20.

Polycarbonates are carbonic acid ester resins derived from bicyclic dihydric phenols and phosgene and feature a high glass transition temperature and heat resistance. Polycarbonates derived from bisphenols, for example, shown in Table 1 can be used as the polycarbonates.

TABLE 1

| Types of bisphenols | Polycarbonates | |
|---|---|---|
| | Melting point (° C.) | Glass transition temperature (° C.) |
| Bis(4-oxyphenyl)methane (4,4'-dioxydiphenyl methane) | 300 or higher | — |
| 1,1-Bis(4-oxyphenyl)ethane (4,4'-dioxydiphenyl-1,1-ethane) | 185–195 | 130 |
| 1,1-Bis(4-oxyphenyl)butane (4,4'-dioxydiphenyl-1,1-butane) | 150–170 | 123 |
| 1,1-Bis(4-oxyphenyl)isobutane (4,4'-dioxydiphenyl-1,1-isobutane) | 170–180 | 149 |
| 1,1-Bis(4-oxyphenyl)cyclohexane (4,4'-dioxydiphenyl-1,1-cyclohexane) | 250–260 | 171 |
| 2,2-Bis(4-oxyphenyl)propane (4,4'-dioxydiphenyl-2,2-propane) | 220–230 | 149 |
| 2,2-Bis(4-oxyphenyl) butane (4,4'-dioxydiphenyl-2,2-butane) | 205–222 | 130 |

Those polycarbonates may be homopolymers, copolymers, or blends, provided that the above-described conditions are satisfied.

A polarizer obtained by causing adsorption of iodine or a dichroic dye on a film composed of a hydrophilic polymer such as polyvinyl alcohol and then stretching and orienting is used as the polarizer 4. However, because iodine evaporates if thermal fixing is carried out after stretching and orientation, the polarizer is used without thermal fixing. For this reason, it is greatly stretched or contracted by temperature changes or moisture changes in the environment. Therefore, the preventive film 3 for a polarizer which is attached to the polarizer 4 by sandwiching and constricts the deformation caused by temperature changes or moisture changes has to have heat resistance in addition to optical transparency. Furthermore, heat resistance and hygroscopicity are also necessary for the preventive film 1 for a polarizing film and the releasable preventive film 2 for a polarizing film which is adhesively bonded to the outer side thereof. Polycarbonates have excellent heat resistance, low hygroscopicity, and a high mechanical strength, and the glass transition temperature thereof is preferably 100° C. or more, even more preferably 150° C. or more. If the glass transition temperature is less than 100° C., the constriction force acting on the polarizer 4 is insufficient, and the polycarbonate film itself sometimes shrinks, causing warping. of the polarizing plate 20.

A film prepared by laminating a thin-layer polyester film 40 on one surface of the polycarbonate film 30 serving as a substrate is used as the preventive film 3 for a polarizer shown in FIG. 2. The polycarbonate film 30 cannot be directly thermally attached to a film composed of a hydrophilic polymer such as polyvinyl alcohol of the polarizer 4. Therefore, polyester films that can be thermally attached to both the polycarbonate film 30 and the polarizer 4 are introduced as thin-layer adhesive layers. Non-oriented polyester films can be thermally attached to those films at a temperature sufficiently lower than the melting point, but in order to attach them thermally at a temperature of 90° C. or less, it is preferred that the melting point of the polyester be 235° C. or less. An ethylene terephthalate—ethylene isophthalate copolymer containing 10–25 mol % of ethylene isophthalate is especially preferred. Furthermore, a copolymer in which part of the alcohol component of ethylene terephthalate is substituted with cyclohexanedimethanol may be also used so as to obtain a melting point of 235° C. or less.

Figure 1:
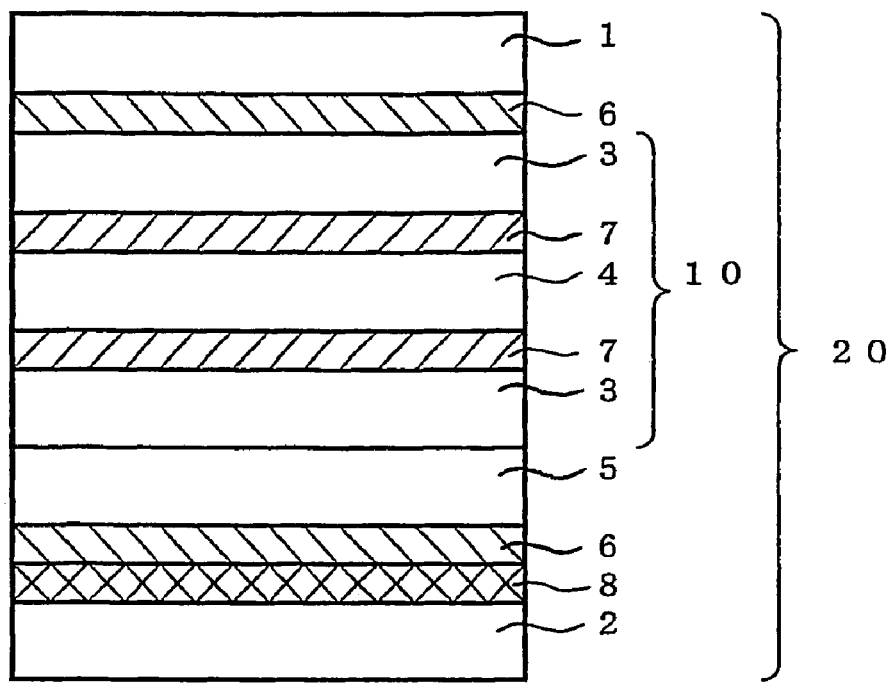
FIG. 1 is a schematic cross-sectional view illustrating an example of the configuration of a polarizing plate.
Figure 5:
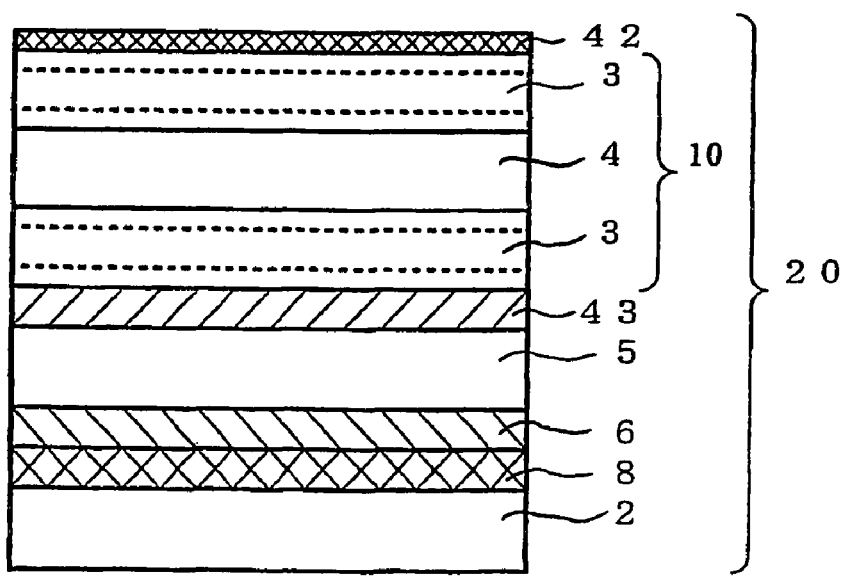
FIG. 5 is a schematic cross-sectional view illustrating another example of the configuration of a polarizing plate in accordance with the present invention.

A hard coat film 42 is sometimes simply formed, as shown in FIG. 5, on the preventive film 3 for a polarizer, without coating the preventive film 1 via the pressure sensitive adhesive 6, as shown in FIG. 1. Furthermore, the phase difference film 5 is sometimes bonded to the preventive film 3 for a polarizer via an adhesive 43. In those cases the resin is coated after dissolving in an organic solvent. However, the non-oriented polycarbonate film serving as a substrate has poor resistance to organic solvents and shrinks or becomes cloudy and nontransparent when an organic solvent adheres thereto. For such applications, a three-layer film is used which is obtained by laminating the polybutylene terephthalate film 41 on the surface of the polycarbonate film 30 onto which the polyester film is not laminated, as shown in FIG. 3. The non-oriented polybutylene terephthalate film does not shrink even when an organic solvent adheres thereto and effectively acts as a layer resistant to organic solvents on the polycarbonate film.

The thickness of the two-layer film is preferably polyester (1–10 µm)/polycarbonate (10–80 µm). The thickness of the three-layer film is preferably polyester (1–10 μm)/polycarbonate (10–80 μm)/polybutylene terephthalate (1–10 μm). If the thickness of the polycarbonate film 30 is less than 10 μm, the deformation of the polarizer caused by temperature changes or humidity content cannot be fully constricted even if the polarizer is sandwiched by the three-layer films. If the thickness exceeds 80 μm, the constriction effect reaches saturation and the structure becomes cost inefficient. It is preferred that the ratio of the thickness of the polyester film 40 and the thickness of the polybutylene terephthalate film 41 to that of the polycarbonate film 30 be 1/50 to 1/5. If the thickness of the polyester film 40 is less than 1/50, sufficient adhesion between the polycarbonate and the polarizer cannot be obtained. On the other hand, if the thickness of the polybutylene terephthalate film 41 is less than 1/50, the polycarbonate cannot be provided with sufficient resistance to organic solvent. Because the glass transition temperature of the polyester or polybutylene terephthalate is lower than that of the polycarbonate, they are easily deformed by temperature changes or moisture changes and if the thickness thereof increases with respect to that of the polycarbonate film 30, then there is a risk of the entire two-layer film or three-layer film being deformed by the deformation of the polarizer 4 as well as the polyester film 40 and the polybutylene terephthalate film 41. Therefore, if the thickness of the polyester film 40 and the thickness of the polybutylene terephthalate film 41 exceed 1/5, the constriction effect of the polycarbonate film becomes insufficient and deformation can occur due to external factors such as temperature changes or moisture changes.

The above-mentioned two-layer film and three-layer film can be fabricated by using a well-known film production method such as a coextrusion method. Furthermore, the two-layer film and three-layer film are manufactured in the form of a long stripe, coiled with a coiler, and attached adhesively on the polarizer 4 or phase difference film 5 while being uncoiled from a state in which they are coiled with a coiler. Those coiling and uncoiling operations can be conducted smoothly if a lubricating agent such as a silica powder with a particle size of 0.1–3.0 μm is introduced in the polyester film 40 and/or polybutylene terephthalate film 41. If no lubricating agent is contained, the operation of coiling on a coiler becomes very difficult. If the particle size and content of the lubricating agent are within the aforementioned ranges, no adverse effect is produced on the detection of optical defects of the polarizing plate 20.

Figure 4:
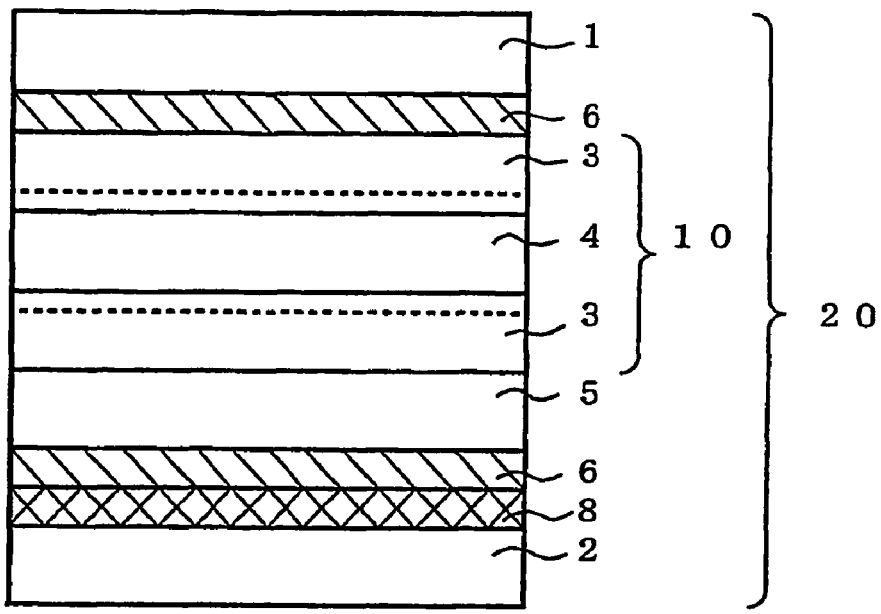
FIG. 4 is a schematic cross-sectional view illustrating an example of the configuration of a polarizing plate in accordance with the present invention.

The polarizing plate 20 is composed by using the preventive film 3 for a polarizer using the non-oriented two-layer film or three-layer film fabricated in the above-described manner. Thus, when a two-layer preventive film for a polarizer is used, polyester film layers are brought into contact with both surfaces of the polarizer 4, as shown in FIG. 4, the preventive films 3 for a polarizer are attached by sandwiching to the polarizer 4, thermal bonding is conducted at a temperature of 90° C. or less, and a polarizing film 10 is formed. In this process, a structure in which the polyester film layer of the preventive film for a polarizer was subjected to a corona discharge processing to increase the adhesive strength may be also used. Then, a preventive film 1 for a polarizing film is attached adhesively on one side of the polarizing film 10 via a pressure sensitive adhesive 6, the phase difference film 5 is bonded to the other side of the polarizing film 10, and a releasable preventive film 2 for a polarizing film that was coated with a releasing agent 8 is attached adhesively to the phase difference film via a pressure sensitive adhesive 6 so that the releasing agent 8 is brought into contact with the pressure sensitive adhesive 6.

When three-layer preventive films 3 for a polarizer are used, as shown in FIG. 5, a solution of a transparent acrylic resin in an organic solvent such as ethyl acetate or methyl ethyl ketone is applied to the polybutylene terephthalate surface of the preventive film 3 for a polarizer to form the hard coat film 42 and to obtain a preventive film for application to one surface of the polarizer 4. Then, a solution of adhesive 43 in an organic solvent such as ethyl acetate or methyl ethyl ketone is applied to the polybutylene terephthalate surface of another three-layer preventive film for a polarizer to obtain a preventive film for application to another surface of the polarizer 4. The polarizer 4 is then sandwiched between the preventive films 3 for a polarizer so that polyester film layers are brought into contact with the two surfaces of the polarizer and the polarizer 4 and the preventive film 3 for a polarizer are thermally attached with a temperature of 90° C. or lower, thus obtain the polarizing film 10. A phase difference film 5 is then bonded to the side of the polarizing film 10 where no hard coat film is formed, and a releasable preventive film 2 for a polarizing film that was coated with a releasing agent 8 is attached adhesively to the phase difference film via a pressure sensitive adhesive 6 so that the releasing agent 8 is brought into contact with the pressure sensitive adhesive 6.

WORKING EXAMPLES

Working Example 1

A polarizing film was fabricated by laminating, with a pair of heat rolls (roll surface temperature: 90° C.), the two-layer films (total film thickness: 80 μm) composed of a polycarbonate (glass transition temperature: 123° C., film thickness 70 μm) and polyethylene terephthalate copolymerized with isophthalic acid (ethylene isophthalate content: 25 mole; film thickness: 10 μm) as preventive films for a polarizer on both surfaces of a polarizer prepared by causing polyvinyl alcohol to adsorb iodine and then conducting uniaxial orientation.

Working Example 2

A test conducted was identical to that of Working Example 1, except that a three-layer film (total film thickness: 80 μm) composed of polybutylene terephthalate (melting point: 225° C.; film thickness: 5 μm), a polycarbonate (glass transition temperature: 150° C., film thickness 65 μm), and polyethylene terephthalate copolymerized with isophthalic acid (ethylene isophthalate content: 15 mole; film thickness: 10 μm) was used as the preventive film for a polarizer.

Comparative Example 1

A test conducted was identical to that of Working Example 1, except that a polycarbonate (glass transition temperature: 150° C.) monolayer film (film thickness 80 μm) was used as the preventive film for a polarizer.

Comparative Example 2

A test conducted was identical to that of Working Example 1, except that a two-layer film (total film thickness: 80 μm) composed of a polycarbonate (glass transition temperature: 150° C.; film thickness 70 μm) and polyethylene terephthalate (film thickness: 10 μm) was used as the preventive film for a polarizer. The results are shown in Table 1.

Comparative Example 3

A test conducted was identical to that of Working Example 1, except that a three-layer film (total film thickness: 80 µm) composed of polybutylene terephthalate (melting point: 225° C.; film thickness: 20 µm), a polycarbonate (glass transition temperature: 150° C., film thickness 5 µm), and polyethylene terephthalate copolymerized with isophthalic acid (ethylene isophthalate content: 15 mole; film thickness: 55 µm) was used as the preventive film for a polarizer.

(Adhesive Strength)

The adhesive strength between the polarizer and the preventive film therefor was visually observed by the presence or absence of interlayer peeling. Then, evaluation was conducted by cutting a sample to a width of 15 mm, applying tension in the 180° direction to the polarizer and the preventive film therefor, and measuring the strength thereof (measurement of 180° peel strength).

(Shape)

The shape was visually evaluated.

(Unit Transmissivity and Degree of Polarization)

Unit light transmissivity and degree of polarization were measured with a spectrophotometer (U-4100, manufactured by Hitachi Ltd.).

The degree of polarization was found by the following formula:

$$\{(T1-T2)/(T1+T2)\}^{1/2} \times 100(\%)$$

where T1 is a light transmissivity measured in a state in which two polarizing films were laminated so that the orientation directions of the polarizers were the same; T2 is a light transmissivity measured in a state in which two polarizing films were laminated so that the orientation directions of the polarizers were orthogonal. The evaluation results are shown in Table 2.

TABLE 2

| Working examples or comparative examples | Adhesive strength | | | Evaluation results | |
|---|---|---|---|---|---|
| | Presence or absence of interlayer peeling | 180° peel strength (g/15 mm) | Shape | Unit transmissivity (%) | Degree of polarization (%) |
| Working example 1 | Absent | 900 | Good | 42.6 | 97.2 |
| Working example 2 | Absent | 980 | Good | 42.4 | 97.1 |
| Comparative example 1 | Present | 10 | Cannot be evaluated | Cannot be evaluated | Cannot be evaluated |
| Comparative example 2 | Present | 5 | Cannot be evaluated | Cannot be evaluated | Cannot be evaluated |
| Comparative example 3 | Absent | 890 | Poor (wavy) | 41.9 | 96.5 |

INDUSTRIAL APPLICABILITY

As described hereinabove, the preventive film for a polarizer in accordance with the present invention which is suitable for polarizing plates of liquid-crystal display devices and the like is composed of a non-oriented two-layer film prepared by laminating a polyester film on one surface of a polycarbonate film with a glass transition temperature of 100° C. or higher, or a non-oriented three-layer film prepared by laminating a polyester film on one surface of a polycarbonate film with a glass transition temperature of 100° C. or higher and laminating a polybutylene terephthalate film on the other surface. The two-layer film and three-layer film are colorless and transparent to the naked eye and can be directly thermally bonded to a polarizer, without using an adhesive. Therefore, the polarizing plate can be manufactured at a low cost.

In a two-layer film, a thin-layer polyester film with a thickness of 1/50–1/5 that of a polycarbonate film is laminated on one surface of the polycarbonate film serving as a substrate. In a three-layer film, a polyester film is laminated on one surface of the polycarbonate film serving as a substrate and a polybutylene terephthalate film is laminated on the other surface, each of the films having a thickness of 1/50–1/5 that of the polycarbonate film. The polycarbonate has a glass transition temperature of higher than 100° C. and a high resistance to deformation induced by temperature changes or moisture changes, and attaching the polarizer which can be easily deformed by those external factors to the preventive films for a polarizer by sandwiching makes it possible to prevent the deformation of the polarizing film comprising the polarizer by the external factors. However, the non-oriented polycarbonate has poor resistance to organic solvents and shrinks or becomes cloudy and non-transparent if an organic solvent adheres thereto. Therefore, in the three-layer film, a thin-layer polybutylene terephthalate film is laminated as a layer resistance to organic solvents on one surface of the polycarbonate film. With such a configuration, because the polycarbonate film is not in direct contact with organic solvents, the preventive film for a polarizer neither shrinks nor becomes cloudy.

Furthermore, in the polarizing plate in accordance with the present invention, a preventive film for a polarizing film is attached adhesively via a pressure sensitive adhesive to one surface of a polarizing film obtained by attaching the preventive films for a polarizer to both surfaces of a polarizer in a sandwiched manner and thermally attaching, a phase difference film is attached to the other side of the polarizing film, and a releasable preventive film for a polarizing film having a releasing agent applied thereto is attached adhesively via a pressure sensitive adhesive on the phase difference film so that the releasing agent is in contact with the pressure sensitive adhesive. Thus, in the polarizing plate in accordance with the present invention, the preventive film for a polarizer in accordance with the present invention is directly thermally attached to the polarizer, without using an adhesive. Therefore, the adhesive application process becomes unnecessary and the polarizing plate can be manufactured at a low cost.

The invention claimed is:

1. A preventive film for a polarizer, composed of a three-layer film in which an ethylene terephthalate—ethylene isophthalate copolymer containing 10–25 mol % of ethylene isophthalate is laminated on one surface of a polycarbonate film, and a polybutylene terephthalate film is laminated on the other surface.

2. The preventive film for a polarizer according to claim 1, wherein said three-layer film is a non-oriented film.

3. The preventive film for a polarizer according to claim 1, wherein the ethylene terephthalate—ethylene isophthalate copolymer is a copolymer in which part of the alcohol component of the ethylene terephthalate is substituted with cyclohexanedimethanol.

4. The preventive film for a polarizer according to claim 1, wherein the glass transition temperature of the polycarbonate is 100° C. or higher.

5. The preventive film for a polarizer according to claim 1, wherein the melting point of ethylene terephthalate—ethylene isophthalate copolymer is 235° C. or lower.

6. In a polarizer comprising a polarizing film and a preventive film,
the improvement wherein the preventive film is in accordance with claim 1.

7. The polarizer of claim 6, wherein said three-layer preventive film comprises non-oriented film.

8. The polarizer of claim 7, wherein the melting point of the ethylene terephthalate—ethylene isophthalate copolymer of said preventive film is 235° C. or lower, said polyester being an ethylene terephthalate—ethylene isophthalate copolymer in which part of the alcohol component of the ethylene terephthalate is substituted with cyclohexanedimethanol.

* * * * *